United States Patent
Harms et al.

(10) Patent No.: US 11,884,520 B2
(45) Date of Patent: Jan. 30, 2024

(54) MOBILE TOWER CRANE SYSTEMS AND METHODS

(71) Applicant: National Oilwell Varco, L.P., Houston, TX (US)

(72) Inventors: Anthony Jason Harms, Hockley, TX (US); Travis Miller, Houston, TX (US); Robert Benjamin Donnally, Houston, TX (US)

(73) Assignee: National Oilwell Varco, L.P., Houston, TX (US)

( * ) Notice: Subject to any disclaimer, the term of this patent is extended or adjusted under 35 U.S.C. 154(b) by 82 days.

(21) Appl. No.: 17/553,119

(22) Filed: Dec. 16, 2021

(65) Prior Publication Data
US 2022/0194753 A1   Jun. 23, 2022

Related U.S. Application Data

(60) Provisional application No. 63/128,540, filed on Dec. 21, 2020.

(51) Int. Cl.
*B66C 23/18* (2006.01)
*B66C 13/18* (2006.01)
*B66C 23/36* (2006.01)

(52) U.S. Cl.
CPC ............ *B66C 23/185* (2013.01); *B66C 13/18* (2013.01); *B66C 23/36* (2013.01)

(58) Field of Classification Search
CPC ....... B66C 23/185; B66C 23/36; B66C 13/18; B66C 23/28; B66C 23/283; B66C 23/42; B66C 23/702; B66C 23/76
See application file for complete search history.

(56) References Cited

U.S. PATENT DOCUMENTS

| | | | | |
|---|---|---|---|---|
| 2,143,111 A | * | 1/1939 | Hayes | B66C 9/14 414/560 |
| 2,200,274 A | * | 5/1940 | Hayes | B66C 23/36 414/560 |
| 2,676,388 A | * | 4/1954 | Faure | B66C 23/283 29/469 |
| 3,194,412 A | * | 7/1965 | Kerridge | B66C 23/283 212/176 |
| 3,572,517 A | * | 3/1971 | Liebherr | B66C 23/76 212/347 |
| 3,638,805 A | * | 2/1972 | Garnier | B66C 23/62 212/175 |
| 3,817,397 A | * | 6/1974 | Wellman | B66C 23/305 212/270 |
| 3,824,578 A | * | 7/1974 | Harders | B66C 23/90 212/277 |

(Continued)

*Primary Examiner* — Michael R Mansen
*Assistant Examiner* — Juan J Campos, Jr.
(74) *Attorney, Agent, or Firm* — Conley Rose, P.C.

(57) ABSTRACT

A tower crane for assembling a wind turbine includes a boom assembly including a boom and a hoisting block coupled to the boom, an extendable tower assembly including a plurality of tower sections, and a transport assembly including a central support frame coupled to the tower assembly, a self-propelled transporter configured to transport the tower crane, and a diagonal brace extending between the central support frame and the transporter, wherein the diagonal brace includes a linear actuator configured to selectably extend and retract the diagonal brace.

26 Claims, 13 Drawing Sheets

(56) References Cited

U.S. PATENT DOCUMENTS

| | | | | | |
|---|---|---|---|---|---|
| 3,856,150 | A | * | 12/1974 | Wellman | B66C 23/346 |
| | | | | | 212/297 |
| 3,868,022 | A | * | 2/1975 | Greenlay | B66D 1/08 |
| | | | | | 212/301 |
| 3,894,635 | A | * | 7/1975 | Reich | B66C 23/283 |
| | | | | | 212/176 |
| 3,938,670 | A | * | 2/1976 | Wellman | B66C 23/34 |
| | | | | | 212/297 |
| 4,243,148 | A | * | 1/1981 | Lampson | B66C 23/74 |
| | | | | | 212/196 |
| 4,537,317 | A | * | 8/1985 | Jensen | B66C 23/74 |
| | | | | | 212/301 |
| 4,614,275 | A | * | 9/1986 | Zenno | B66C 23/36 |
| | | | | | 212/198 |
| 7,258,242 | B2 | * | 8/2007 | Irsch | B66C 23/82 |
| | | | | | 212/300 |
| 2009/0127219 | A1 | * | 5/2009 | Willim | B66C 23/702 |
| | | | | | 212/300 |
| 2009/0151483 | A1 | * | 6/2009 | Kim | B62D 55/116 |
| | | | | | 74/2 |
| 2011/0017694 | A1 | * | 1/2011 | Noske | B66C 23/36 |
| | | | | | 212/223 |
| 2011/0278252 | A1 | * | 11/2011 | De Carvalho Cal | B66C 13/16 |
| | | | | | 701/50 |
| 2015/0014266 | A1 | * | 1/2015 | Rafailovic | B66C 23/16 |
| | | | | | 212/199 |

* cited by examiner

MOBILE TOWER CRANE SYSTEMS AND METHODS

CROSS-REFERENCE TO RELATED APPLICATIONS

The present application claims benefit of U.S. provisional patent application No. 63/128,540 filed Dec. 21, 2020, entitled "Mobile Tower Crane Systems and Methods," which is incorporated herein by reference in its entirety for all purposes.

STATEMENT REGARDING FEDERALLY SPONSORED RESEARCH OR DEVELOPMENT

Not applicable.

BACKGROUND

Wind turbines (also sometimes referred to as "windmills") are generally configured to convert wind into electrical energy and typically include a tapered turbine tower and a wind turbine nacelle positioned atop the turbine tower. Wind turbines also typically include a rotor comprising a plurality of circumferentially spaced wind turbine blades. The rotor may be connected to the nacelle through a driveshaft that extends from the nacelle. Wind turbine towers, which may be comprises of a plurality of tower units connected end-to-end, may be several hundred feet in length and may thus may be assembled at the location where the wind turbine will be operated. Wind turbines are typically assembled at the location where the turbine will be operated using a large capacity tower crane that may be several hundred feet in length.

SUMMARY

An embodiment of a tower crane for assembling a wind turbine comprises a boom assembly comprising a boom and a hoisting block coupled to the boom, an extendable tower assembly comprising a plurality of tower sections, and a transport assembly comprising a central support frame coupled to the tower assembly, a self-propelled transporter configured to transport the tower crane, and a diagonal brace extending between the central support frame and the transporter, wherein the diagonal brace comprises a linear actuator configured to selectably extend and retract the diagonal brace. In some embodiments, the transport assembly further comprises a transporter arm extending between the central support frame and the transporter and a horizontal brace extending between the central support frame and the transporter arm, and wherein the horizontal brace comprises a passive linear damper. In some embodiments, the horizontal brace comprises a lock configured to selectably lock the linear damper. In certain embodiments, the transporter of the transport assembly comprises a guide assembly that it pivotably coupled to a body of the transporter, and wherein the guide assembly comprises an inclination sensor in signal communication with a control system of the transport assembly. In certain embodiments, the transport assembly further comprises a control system configured to maintain a predetermined inclination of a central axis of the tower crane as the tower crane is transported by the transporter. In some embodiments, the control system comprises an inclination sensor. In some embodiments, the tower crane further comprises a climbing assembly coupled between the tower assembly and the boom assembly and configured to extend a height of the tower assembly. In certain embodiments, the transporter comprises a ground support pad actuatable between a retracted position spaced from a terrain on which the tower crane is positioned and a deployed position in contact with the terrain. In certain embodiments, the tower crane comprises a control system configured to automatically deploy the ground pad of the transporter from the retracted position to the deployed position in response to a ground pressure applied by the transporter against the terrain reaching a predefined ground pressure limit.

An embodiment of a tower crane for assembling a wind turbine comprises a boom assembly comprising a boom and a hoisting block coupled to the boom, an extendable tower assembly comprising a plurality of tower sections, and a transport assembly comprising a central support frame coupled to the tower assembly, a self-propelled transporter coupled to the central support frame and configured to transport the tower crane, and a control system configured to maintain a predetermined inclination of a central axis of the tower crane as the tower crane is transported by the transporter. In some embodiments, the transport assembly further comprises a diagonal brace extending between the central support frame and the transporter, wherein the diagonal brace comprises a linear actuator configured to selectably extend and retract the diagonal brace. In some embodiments, the linear actuator of the diagonal brace is controlled by the control system to maintain the predetermined inclination of a central axis of the tower crane. In certain embodiments, the transport assembly comprises a support configuration having a first width and a transport configuration having a second width that is less than the first width. In certain embodiments, the transporter is displaceable along a circumference to actuate the transport assembly from the support configuration to the transport configuration. In some embodiments, the transporter of the transport assembly comprises a guide assembly that it pivotably coupled to a body of the transporter, and wherein the guide assembly comprises an inclination sensor in signal communication with a control system of the transport assembly. In some embodiments, the tower crane further comprises a climbing assembly coupled between the tower assembly and the boom assembly and configured to extend a height of the tower assembly. In certain embodiments, the transporter comprises a ground support pad actuatable between a retracted position spaced from a terrain on which the tower crane is positioned and a deployed position in contact with the terrain. In certain embodiments, the tower crane comprises a control system configured to automatically deploy the ground pad of the transporter from the retracted position to the deployed position in response to a ground pressure applied by the transporter against the terrain reaching a predefined ground pressure limit.

An embodiment of a tower crane for assembling a wind turbine comprises a boom assembly comprising a boom and a hoisting block coupled to the boom, an extendable tower assembly comprising a plurality of tower sections, and a transport assembly comprising a central support frame coupled to the tower assembly, a self-propelled transporter coupled to the central support frame and configured to transport the tower crane, wherein the transporter comprises a guide assembly that it pivotably coupled to a body of the transporter, and wherein the guide assembly comprises an inclination sensor in signal communication with a control system of the transport assembly. In some embodiments, the transport assembly further comprises a diagonal brace extending between the central support frame and the transporter, wherein the diagonal brace comprises a linear actuator configured to selectably extend and retract the diagonal brace. In some embodiments, the transporter comprises motor coupled to the body and a pair of continuous crawler tracks rotatable about the body. In certain embodiments, the control system is configured to maintain a predetermined inclination of a central axis of the tower crane as the tower crane is transported by the transporter. In certain embodiments, the transport assembly further comprises a transporter arm extending between the central support frame and the transporter and a horizontal brace extending between the central support frame and the transporter arm, and wherein the horizontal brace comprises a passive linear damper. In some embodiments, the tower crane further comprises a climbing assembly coupled between the tower assembly and the boom assembly and configured to extend a height of the tower assembly. In certain embodiments, the transporter comprises a ground support pad actuatable between a retracted position spaced from a terrain on which the tower crane is positioned and a deployed position in contact with the terrain. In certain embodiments, the tower crane comprises a control system configured to automatically deploy the ground pad of the transporter from the retracted position to the deployed position in response to a ground pressure applied by the transporter against the terrain reaching a predefined ground pressure limit.

BRIEF DESCRIPTION OF THE DRAWINGS

For a detailed description of exemplary embodiments of the disclosure, reference will now be made to the accompanying drawings in which.

DETAILED DESCRIPTION

Figure 1:
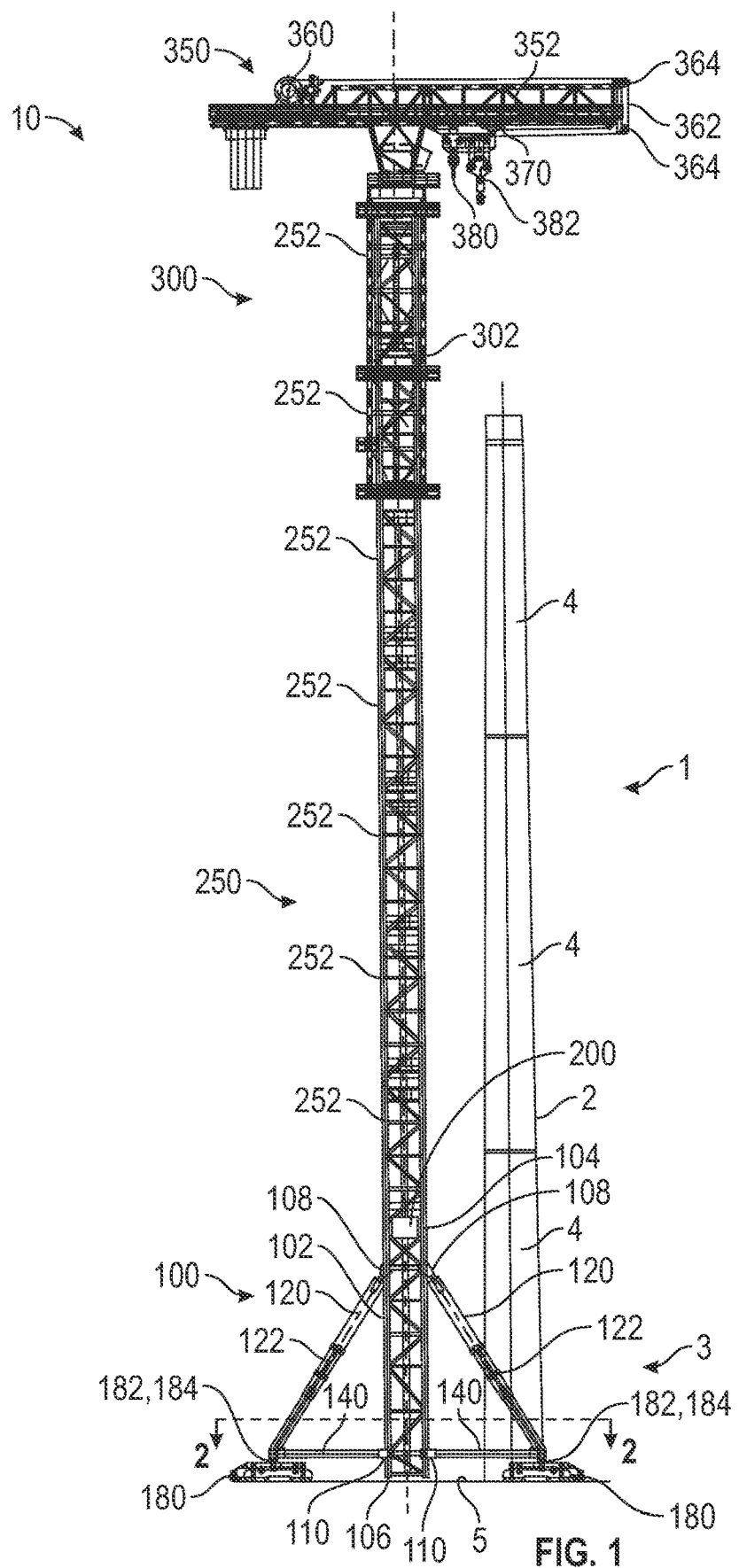
FIG. 1 is a front view of an embodiment of a tower crane.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis.

Figure 2:
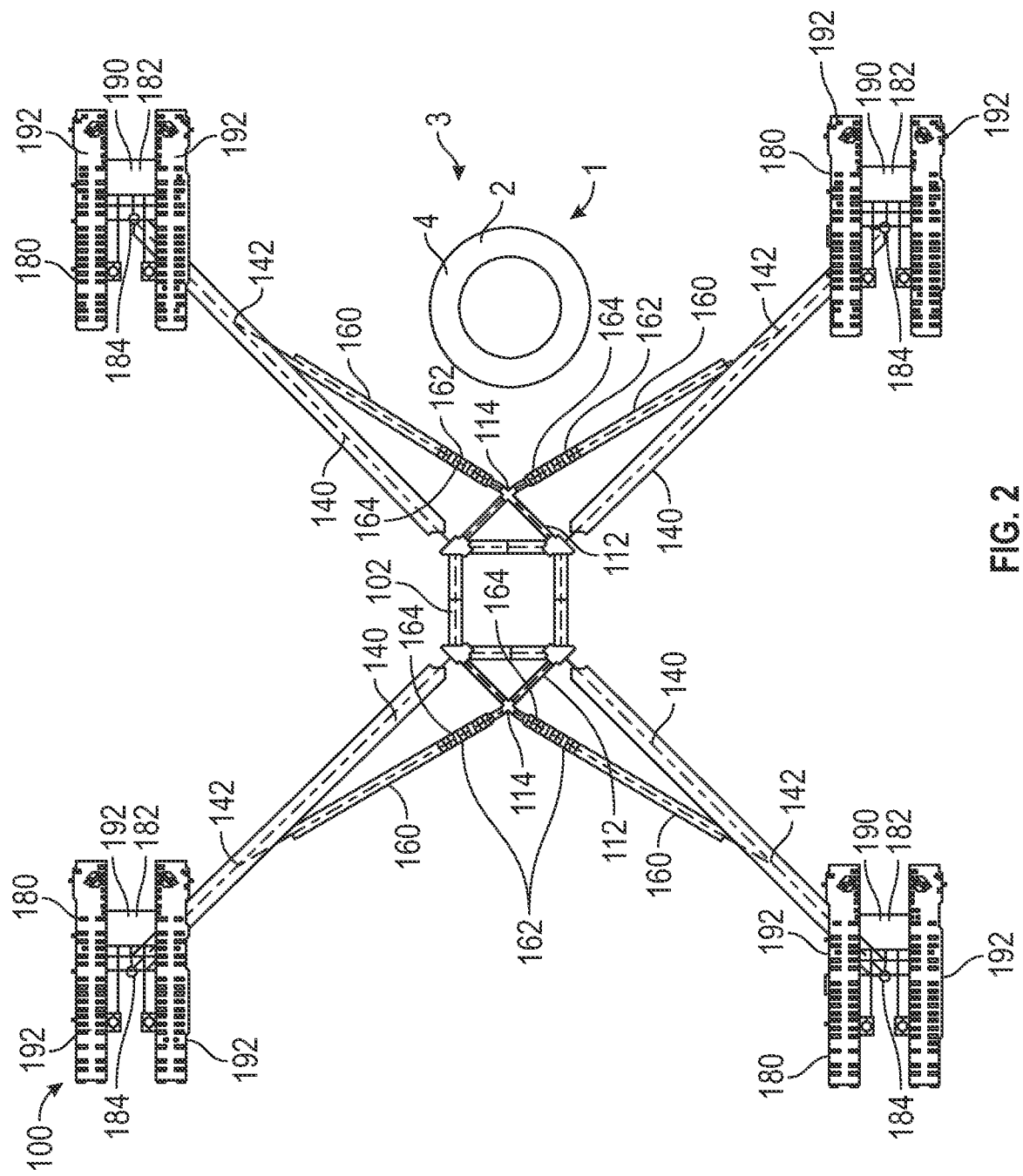
FIG. 2 is a cross-sectional view along lines 1-1 in FIG. 1 of the tower crane of FIG. 1.

Referring now to FIGS. 1, 2, an embodiment of a tower crane 10 for assembling a wind turbine 1 is shown. In this exemplary embodiment, tower crane 10 has a central or longitudinal axis 15 and generally includes a self-propelled transport or mobility assembly 100, an extendable tower assembly 250, a climbing assembly 300, and a boom assembly 350. As will be described further herein, tower crane 10 may be transportable between separate locations via transport assembly 100 when transport assembly 100 of tower crane 10 is in a transport configuration. For example, a plurality of wind turbines 1 may be arranged in a particular location, such as a wind farm. In some applications, wind farms may comprise several hundred wind turbines 1 and may cover an extensive area. Additionally, the area over which a wind farm covers may be of relatively uneven grade. For instance, some wind farms may include areas having up to a 10% grade or slope. As will be discussed further herein, transport assembly 100 is configured to safely transport the tower crane 10 over uneven terrain between different work sites 3 so that tower crane 10 may assemble a plurality of wind turbines 1 without needing to be disassembled and shipped between sequential work sites 3.

Once transported to a work site 3 at which it is desired to assemble a wind turbine 1, transport assembly 100 may be actuated into a working or support configuration (shown in FIGS. 1, 2) to allow tower crane 10 to assemble wind turbine 1. Wind turbine 1 is shown as partially assembled in FIG. 1 and includes a wind turbine tower 2 comprising a plurality of tower sections 4 which are connected end-to-end during the assembly of wind turbine 1. Although only a partially assembled wind turbine tower 2 of wind turbine 1 is shown in FIG. 1, wind turbine 1 may additionally include a nacelle positionable atop wind turbine tower 2 and a rotor comprising a plurality of circumferentially spaced wind turbine blades may be rotatably coupled to the nacelle when wind turbine 1 is fully assembled. As will be discussed further herein, tower assembly 250 is extendable in height to accommodate for the growing height of wind turbine tower 2 as wind turbine 1 is assembled by tower crane 10.

In this exemplary embodiment, the transport assembly 100 of tower crane 10 generally includes a central support structure or frame 102, a plurality of telescoping diagonal members or braces 120, a plurality of horizontally extending (relative to the ground 5) transporter arms 140, a plurality of telescoping horizontal members or braces 160, a plurality of self-propelled transporters or crawlers 180, and a control system 200. While in this embodiment transport assembly 100 comprises a component of tower crane 10, in other embodiments, transport assembly 100 may be utilized in cranes other than tower crane 10, including cranes other than tower cranes used to assemble wind turbines.

In this exemplary embodiment, the central support frame 102 of transport assembly 100 has a rectangular, box-like shape or configuration and includes a first or upper end 104 and a second or lower end 106 opposite upper end 104. Central support frame includes a central or longitudinal axis which is coaxial with the central axis 15 of tower crane 10. Central support frame 102 may be comprised of a plurality of support beams or members coupled together such as steel I-beams or other types of structural support members.

Central support frame 102 includes a plurality of first or upper pivot mounts 108 which pivotably couple the diagonal braces 120 to the central support frame 102. Upper pivot mounts 108 are located proximal the upper end 104 of central support frame 102. Central support frame 102 additionally includes a plurality of second or lower pivot mounts 110 which pivotably couple transporter arms 140 to the central support frame 102. Lower pivot mounts 110 are located proximal the lower end 106 of central support frame 102. Further, central support frame 102 includes a pair of control arms 112 extending horizontally from opposite sides of central support frame 102. Each control arm 112 is located proximal the lower end 106 of central support frame 102. Additionally, each control arm 112 comprises a pivot mount 114 to which a pair of the horizontal braces 160 pivotably connects. Pivot mounts 108, 110, and 114 are configured to permit diagonal braces 120, transporter arms 140, and horizontal braces 160, respectively, to pivot about a plurality of axes relative to central support frame 102, including both a longitudinal axis (extending parallel central axis 15) and a horizontal axis (extending orthogonal central axis 15). In some embodiments, each pivot mount 108, 110, and 114 may comprise a pair of pinned joints where each pin extends orthogonally from one another in order to allow for rotation about at least two orthogonal axes.

In this exemplary embodiment, each diagonal brace 120 comprises a linear actuator 122 configured to selectably retract and extend the diagonal brace 120. Thus, each diagonal brace 120 has a variable or adjustable length. In this exemplary embodiment, linear actuators 122 comprise hydraulic actuators; however, in other embodiments, the configuration of linear actuators 122 may vary. For example, in other embodiments, linear actuators 122 may comprise pneumatic, electrical, and electromagnetic linear actuators. As will be discussed further herein, linear actuators 122 are controllable by control system 200 (shown schematically in FIG. 1 as supported on central support frame 102) to maintain the central axis 15 of tower crane 10 in a substantially vertical orientation (relative to the direction of gravity) both when tower unit 10 is engaged in the process of assembling a wind turbine 1 and when tower unit 10 is being transported by transport assembly 100.

Transporter arms 140 of transport assembly 100 may each comprise rigid members (e.g., steel tubes, I-frames, etc.) having a fixed length and extending between central support frame 102 and one of the transporters 180, thereby coupling the transporters 180 with the central support frame 102. As described above, each transporter arm 140 may pivot both about a vertical axis and a horizontal axis relative central support frame 102 via the pivotable connection provided by lower pivot mounts 110.

In this exemplary embodiment, each horizontal brace 160 extends between the pivot mount 114 of one of the control arms 112 and a pivot mount 142 positioned along one of the transporter arms 140. Pivot mounts 142 of transporter arms 140 may allow each horizontal brace 160 to pivot relative the corresponding transporter arm 140 to which it is coupled about both a vertical axis and a horizontal axis. In some embodiments, pivot mount 142 may comprise a pinned connection. In this embodiment, each horizontal brace 160 comprises an extendable and retractable linear damper 162 positioned along its length. Linear dampers 162 may be passive and thus may not be forcibly extended or retracted by an actuator.

Additionally, each horizontal brace 160 includes a lock 164 configured to lock the position of linear damper 162 and thereby lock the length of the horizontal brace 160. Particularly, each lock 164 comprises an unlocked position which allows the linear damper 162 of the horizontal brace to freely retract and extend, thereby providing the horizontal brace 160 with a variable length. Each lock 164 also includes a locked position which locks the position of linear damper 162, preventing the damper 162 from retracting and extending and thereby providing the horizontal brace 160 with a fixed length. In some embodiments, the lock 164 may be actuatable between the unlocked and locked positions manually by an operator of tower crane 10. In other embodiments, lock 164 may be actuatable between the unlocked and locks positions by an actuator connected thereto, the actuator being controllable by an operator of tower crane 10 or via the control system 200. In some embodiments, each lock 164 may comprise a threaded collar or locking pin; however, in other embodiments, the configuration of lock 164 may vary.

As will be discussed further herein, when locks 164 of horizontal braces 160 are in the unlocked position, each transporter arm 140 may be rotated about a vertical axis extending through the lower pivot mount 110 to which the transporter arm 140 is coupled and parallel with central axis 15 of tower crane 10. However, when locks 164 are in the locked position, each transporter arm 140 is locked into a particular circumferential position about central axis 15 whereby the transporter arm 140 cannot be rotated about the vertical extending through the lower pivot mount 110 to which the transporter arm 140 is coupled.

Each transporter 180 of transport assembly 100 generally includes a body 182, a motor 190, and a pair of continuous crawler tracks 192 rotatably coupled to and driven by the motor 190. The body 182 of each transporter 180 includes a pivot mount 184 to which one of the diagonal braces 120 and one of the horizontal braces 140 independently connect. The pivotable connection provided by pivot mount 184 may allow the diagonal brace 120 and the horizontal brace 140 to pivot independently about both a vertical axis and a horizontal axis relative to the transporter 180. Diagonal braces 120, which extend both vertically and horizontally, may transfer loads from tower assembly 250, climbing assembly 300, and boom assembly 350 to the transporters 180 such that transporters 180 may stabilize tower crane 10. The loads transferred to transporters 180 by diagonal braces 120 may be due to the weight of tower assembly 250, climbing assembly 300, and boom assembly 350, as well as loads externally applied to tower assembly 250, climbing assembly 300, and boom assembly 350, such as wind loads and loads associated with, for example, lifting tower sections 4 of wind turbine 1.

In some embodiments, the motor 190 of each transporter 180 comprises a single motor configured to drive both crawler tracks 192 via a drivetrain (not shown in FIGS. 1, 2) connected therebetween. However, in other embodiments, motor 190 may comprise a pair of motors configured to independently drive the pair of crawler tracks 192. In some embodiments, motor 190 comprises at least one of a hydraulic and an electric motor; however, in other embodiments, the configuration of motor 190 may vary. Crawler tracks 192 of each transporter 180 may be driven to drive or transport the transporter 180 linearly in a given direction and to rotate the transporter 180 about a vertical axis that extends through the body 182 of the transporter 180. For example, each crawler track 192 may be driven at the same speed and in the same rotational direction by motor 190 to drive or transport the transporter 180 in a fixed or constant direction. However, by varying the speed of each crawler track 192 and/or by rotating crawler tracks 192 in opposing rotational directions, the transporter 180 may be rotated about the vertical axis by crawler tracks 192. In this manner, tower crane 10 may be steered by transporters 180 as the tower crane 10 travels between work sites 3. Additionally, and as will be discussed further herein, by rotating transporters 180, transport assembly 100 may be actuated between the transport configuration and a work or stabilizing configuration (shown in FIGS. 1, 2) in which transport assembly 100 is configured to stabilize tower crane 10 as tower crane 10 assembles a wind turbine 1.

In this exemplary embodiment, the motors 190 of transporters 180 are controlled by an operator of tower crane 10 through control system 200 which is in signal communication with a controller of each motor 190; however, in other embodiments, the operation of transporters 180 may be controlled via a variety of varying mechanisms and schemes. Additionally, in this exemplary embodiment, transporters 180 generally comprise crawlers. However, in other embodiments, the transporters 180 of transport assembly 100 may comprise other types of transporters such as wheeled dollies or self-propelled modular transporters (SPMTs) having a plurality of wheels rather than a pair of crawler tracks, as well as other types of transporters. Examples of wheeled dollies which may comprise transporters are shown and described in U.S. Pat. No. 9,896,887, which is incorporated by reference herein in its entirety. In still other embodiments, the transporters 180 of transport assembly 100 may comprise electrically driven tire systems, such as those described in U.S. Pat. Nos. 10,293,854 and 10,471,986, each of which are incorporated by reference herein in their entirety. In still other embodiments, transporters 190 of transport assembly 100 may comprise a rail mounted moving system, such as the systems described in U.S. Pat. Nos. 9,677,298 and 9,970,211, each of which are incorporated by reference herein in their entirety.

Figure 3:
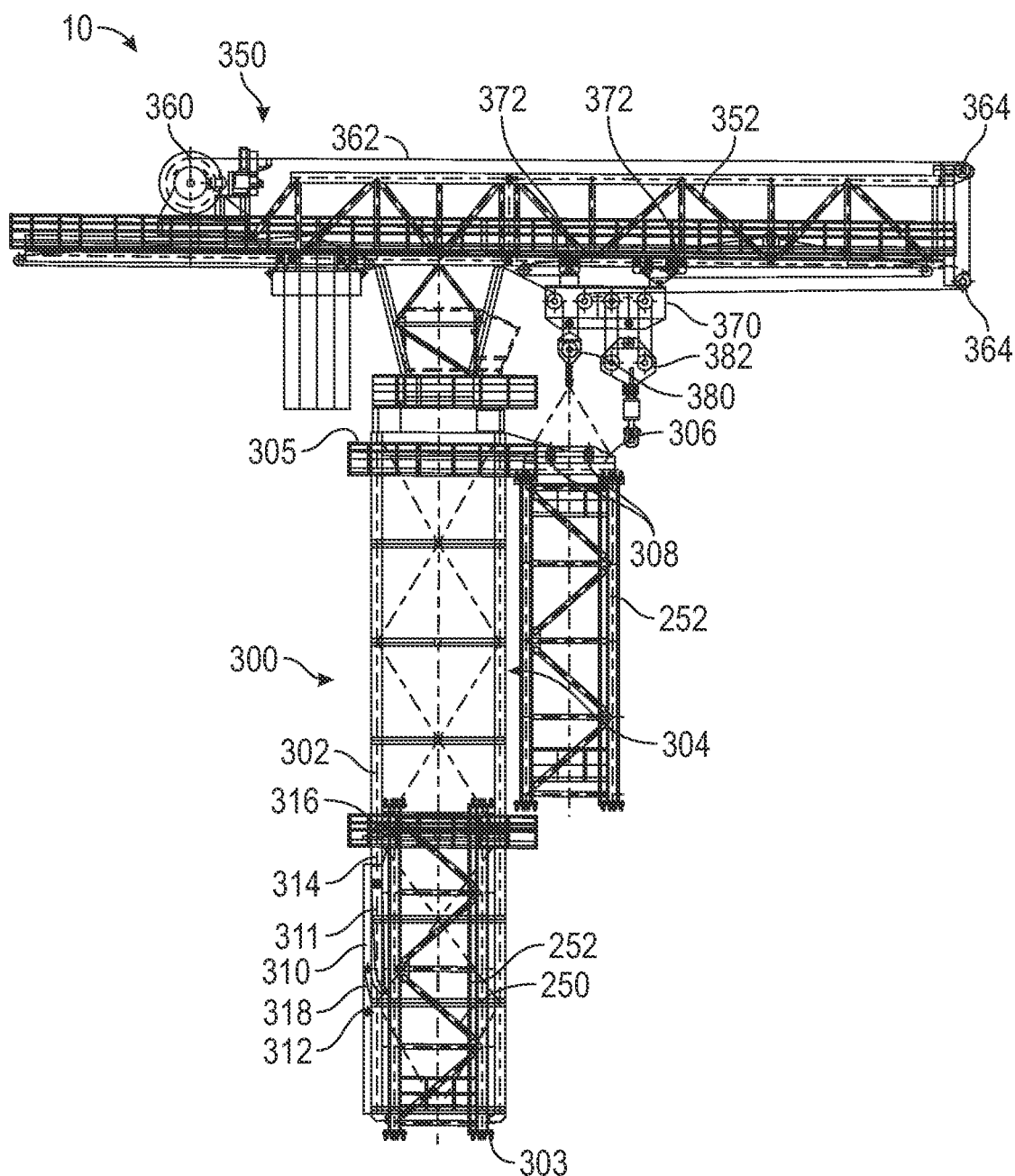
FIG. 3 is a front view of an embodiment of a climbing assembly and a boom assembly of the tower crane of Figure.

Referring to FIGS. 1, 3, views of the tower assembly 250, climbing assembly 300, and boom assembly 350 of tower crane 10 are shown. In this exemplary embodiment, tower assembly 250 extends along central axis 15 and generally includes a plurality of tower sections 252 which may be assembled end-to-end using climbing assembly 300 and boom assembly 350 as tower crane 10 assembles wind turbine 1. Each tower section 252 of tower assembly 250 may have a rectangular, box-like shape or configuration and may be comprised of a plurality of support beams or members coupled together such as steel I-beams or other types of structural support members. Each end of each tower section 252 may include fasteners for coupling the tower sections 252 end-to-end as tower crane 10 assembles wind turbine 1.

Tower assembly 250 may comprise a fully retracted configuration comprising a minimum number of tower sections 252 connected end-to-end and a fully extended configuration comprising a maximum number of tower sections 252 connected end-to-end. The tower assembly 250 of tower crane 10 is shown in a partially extended configuration in FIG. 1 having a length that is greater than the length of tower assembly 250 when in the fully retracted configuration but less than the length of assembly 250 when in the fully extended configuration. Tower crane 10 may begin assembling wind turbine 1 when tower assembly 250 is in the fully retracted configuration, the tower assembly 250 gradually increasing in length as tower crane 10 assembles wind turbine 1 until tower assembly 250 is in the fully extended configuration, at which point the assembly of tower crane 10 may be completed. Additionally, tower crane 10 may be transported by transport assembly 100 when tower assembly 250 is in the fully retracted configuration.

In this exemplary embodiment, climbing assembly 300 generally includes a climbing frame 302, and a climbing actuator assembly 310. Climbing frame 302 of climbing assembly 300 extends along central axis 15 and may have a rectangular, box-like shape or configuration and may be comprised of a plurality of support beams or members coupled together such as steel I-beams or other types of structural support members. Climbing frame 302 includes a first or lower end 303 coupled to the upper end 104 of the central support frame 102 of transport assembly 100 and a second or upper end 304 coupled to boom assembly 350.

Additionally, climbing frame 302 includes a rectangular opening 304 extending along one side of the frame 302. The opening 304 is configured to receive a tower section 252 to be added to an upper end of the tower assembly 250. Further, climbing frame 302 includes a trolley 306 including a plurality of guide rollers 308 and which is configured to be displaced between an offset position (shown in FIG. 3) offset from central axis 15 and an aligned position aligned with central axis 15. Trolley 306 may couple to an upper end of a tower section 252 to be added to tower assembly 250 when in the offset position. With the tower section 252 attached thereto, rail assembly 360 may be displaced from the offset position to the aligned position thereby transporting the tower section 252 through opening 304 and into a position aligned with central axis 15 and positioned directly above the tower assembly 250 whereby the tower section 252 may be coupled to the upper end of tower assembly 250.

At least a portion of the climbing frame 302 is positioned about the upper end of tower assembly 250. The climbing actuator assembly 310 of climbing assembly 300 may be coupled between climbing frame 302 and tower assembly 250 and is generally configured to transport climbing assembly 300 vertically along or climb tower assembly 250 via a pair of linear actuators 311. Particularly, in this exemplary embodiment, actuator assembly 310 comprises the pair of linear actuators 311, a lower latch 312, an upper latch 314, guide rollers 316, and a dolly 318. In this exemplary embodiment, linear actuators 311 comprise hydraulic actuators; however, in other embodiments, the configuration of linear actuators 311 may vary. For example, in other embodiments, linear actuators 311 may comprise pneumatic, electrical, and electromagnetic linear actuators.

Lower latch 312 of actuator assembly 310 is configured to selectably couple or affix a lower end of the linear actuators 311 to the tower assembly 250 such that loads from boom assembly 350 and climbing assembly 300 may be transferred to tower assembly 250. Similarly, upper latch 314 of actuator assembly 310 is configured to selectably couple or affix an upper end of the linear actuators 311 to the tower assembly 250 such that loads from boom assembly 350 and climbing assembly 300 may be transferred to tower assembly 250. Additionally, guide rollers 316 permit the upper end of linear actuators 311 to travel along tower assembly 250 when upper latch 314 is disengaged while dolly 318 permits the lower end of linear actuators 311 to travel along tower assembly 250 when the lower latch 312 is disengaged. By selectably disengaging latches 312, 314 and extending and retracting linear actuators 311, actuator assembly 310 may crawl vertically along the tower assembly 250, carrying the climbing frame 302 and boom assembly 350 along with the actuator assembly 310. In this manner, climbing assembly 300 allows for the extension of tower assembly 250 (via adding new tower sections 252 thereto) while maintaining boom assembly 350 at an upper end of tower crane 10.

Boom assembly 350 of tower crane 10 is configured to both lift tower sections 252 from the ground 5 so they may be added to tower assembly 250 and to lift components of wind turbine 1 (e.g., tower sections 4 of turbine tower 2, etc.) as tower crane 10 assembles wind turbine 1. In this embodiment, boom assembly 350 generally includes a boom 352, a winch assembly 360, a trolley 370, a first hoisting block 380, and a second hoisting block 382. Boom 352 extends along a longitudinal axis that is orthogonal to central axis 15 and boom 352 is pivotably connected to the upper end 305 of the climbing frame 302 of climbing assembly 300 via a pivot mount 354. Particularly, boom 352 may pivot about a vertical axis that extends coaxially with central axis 15. Boom 352 may be comprised of a plurality of support beams or members coupled together such as steel I-beams or other types of structural support members.

Winch assembly 360 is supported on boom 352 and is configured to extend and retract a plurality of cables 362 extending therefrom. Particularly, cables 362 extend from winch assembly 360, over a plurality of sheaves 364, and to the hoisting blocks 380, 382. Hoisting blocks 380, 382 are coupled to trolley 370 which includes a plurality of guide wheels 372 and is allowed to travel along the length of boom 352. Blocks 380, 382, each connected to the cables 32, are independently lowerable and raisable in response to the actuation of winch assembly 360. In this embodiment, first hoisting block 380 is configured to lift tower sections 252 from the ground 5 to a vertical position where the tower section 252 may couple to trolley 306 of climbing assembly 300 and thereby be added to the tower assembly 250. The second hoisting block 382 is configured to lift components of wind turbine 1 from the ground 5, such as the tower sections 4 of the turbine tower 2.

Figure 4:
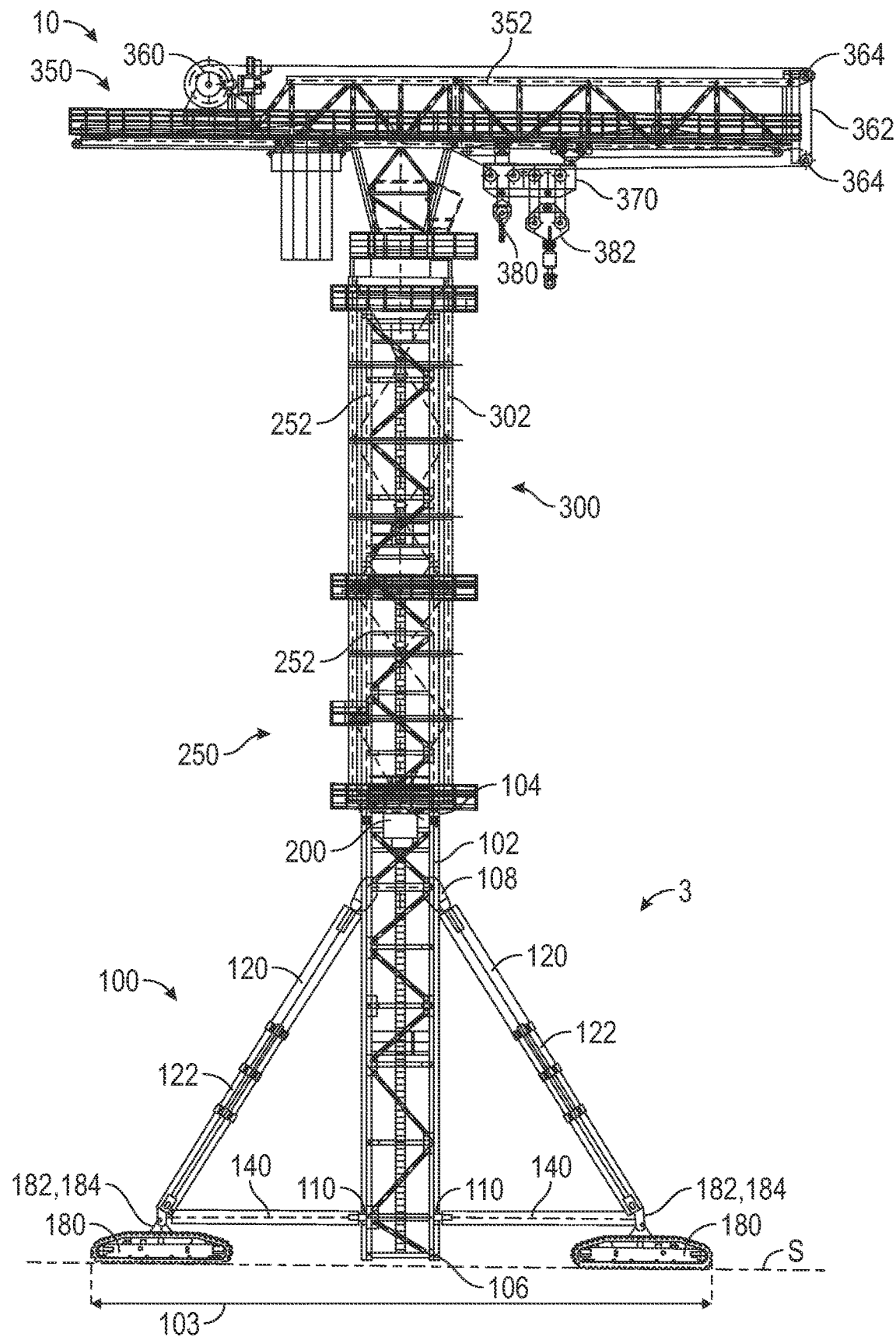
FIG. 4 is a front view of the tower crane of FIG. 1 in a support configuration.

Referring now to FIGS. 4-9, as described above, transport assembly 100 is configured to transport tower crane 10 between a plurality of work sites 3 along uneven terrain. For example, following the assembly of a wind turbine 1 at a first work site 3 and with transport assembly 100 disposed in the support configuration, tower assembly 250 may be retracted into the fully retracted configuration as shown in FIG. 4 such that climbing assembly 300 is positioned directly above and adjacent to the upper end 104 of the central support frame 102 of transport assembly 100. Tower assembly 250 may be retracted into the fully retracted configuration by removing a plurality of tower sections 252 from the tower assembly 250 via the opening 304 formed in the climbing frame 302 of climbing assembly 300.

Figure 5:
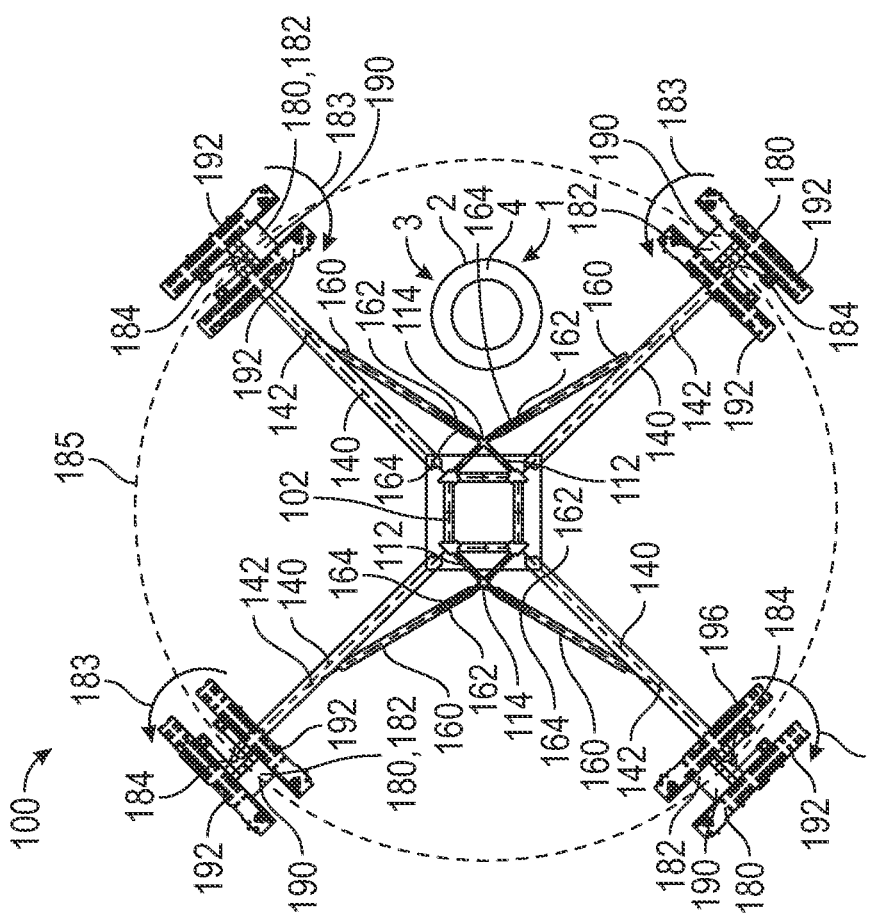

As shown particularly in FIG. 5, in this example and following the retraction of tower assembly 250 into the fully retracted configuration, the motor 190 of each transporter 180 may be operated to rotate (indicated by arrows 183 in FIG. 5) each transporter 180 approximately 45 degrees about a vertical axis such that each transporter 180 is disposed tangent a common circumference 185. Additionally, transporters 180 may be rotated in place such that they do not travel linearly along ground 5 and do not rotate the transporter arms 140 coupled therewith. In some embodiments, transporters 180 are rotated in place by rotating the pair of crawler tracks 192 of each transporter 180 in opposed rotational directions.

Figure 6:
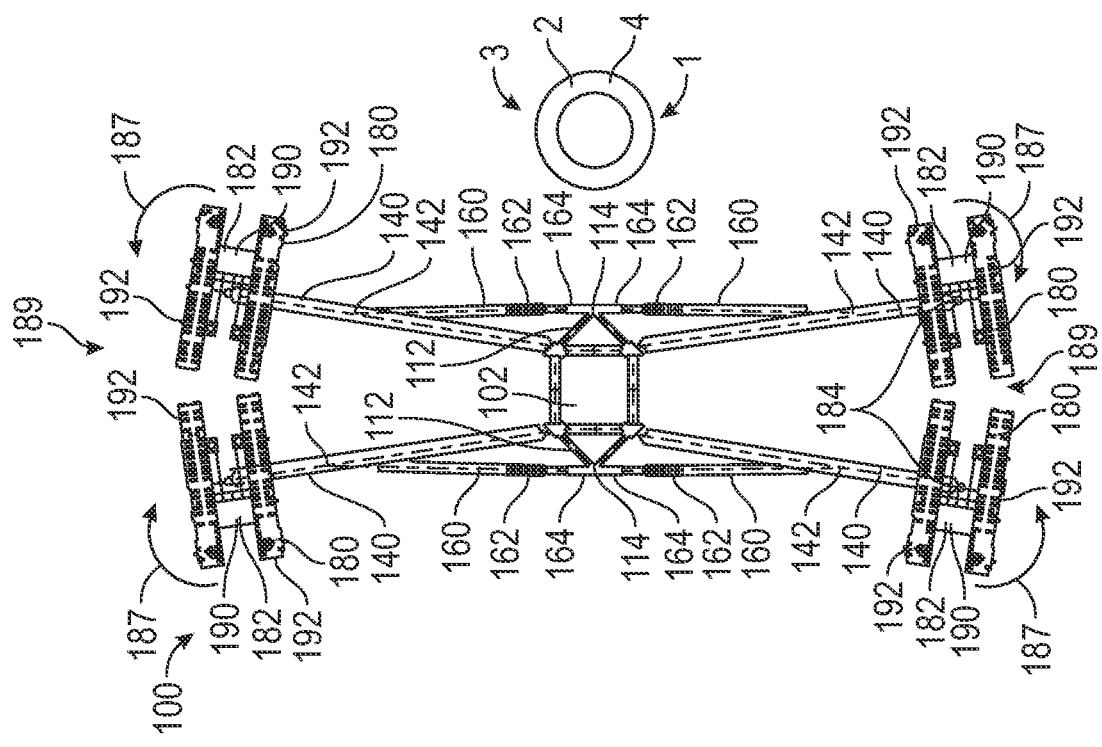
FIGS. 5, 6 are cross-sectional views of the tower crane of FIG. 1.
Figure 7:
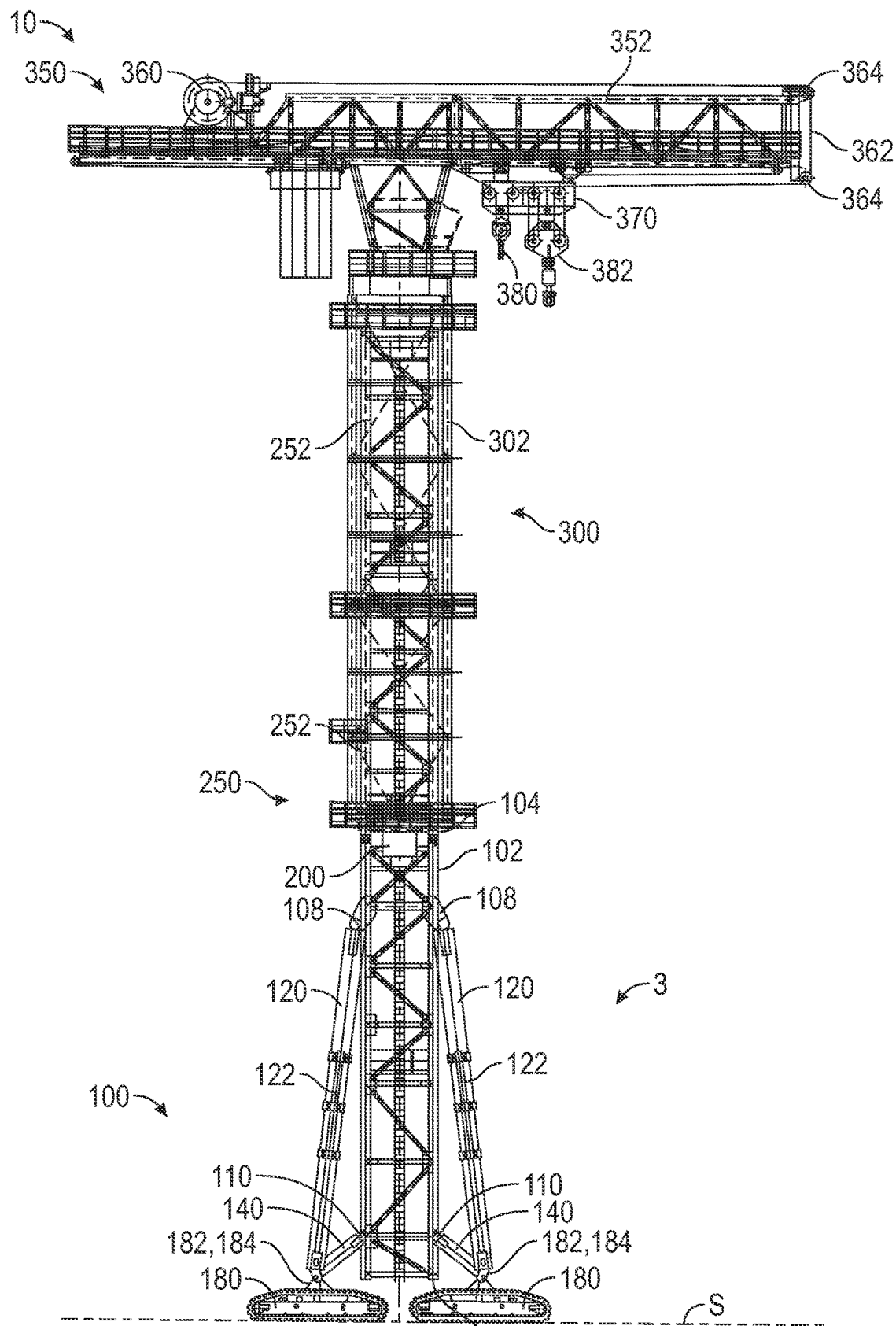
FIG. 7 is another front view of the tower crane of FIG. 1.

As shown particularly in FIGS. 6, 7, in this example and with transporters 180 positioned tangent circumference 185, the motor 190 of each transporter 180 may be operated to transport or drive (indicated by arrows 187 in FIG. 6) each transporter 180 along circumference 185 such that transporters 180 are arranged in circumferentially adjacent pairs 189 located at opposite ends of wind tower 10. As transporters 180 travel along circumference 185, each transporter 180 rotates a corresponding transporter arm 140 and horizontal brace 160 coupled therewith such that transporter arms 140 and horizontal braces 160 extend nearly parallel with each other. Additionally, linear dampers 162 of horizontal braces 160 extend as transporters 180 travel along circumference 185 such that each horizontal brace 160 occupies a fully deployed position when transporters 180 are arranged in circumferentially adjacent pairs 189.

With transporters 180 arranged in circumferentially adjacent pairs 189 as shown in FIGS. 6, 7, the lock 164 of each horizontal brace 160 may be actuated into the locked position thereby preventing the linear dampers 162 of horizontal braces 160 from being retracted. Additionally, with locks 164 in the locked position, the angular position of each transporter arm 140 relative to the lower pivot mount 110 of central support frame 102 from which the transporter arm 140 extends is also locked, preventing the transporter arm 140 from rotating about the lower pivot mount 110.

Figure 8:
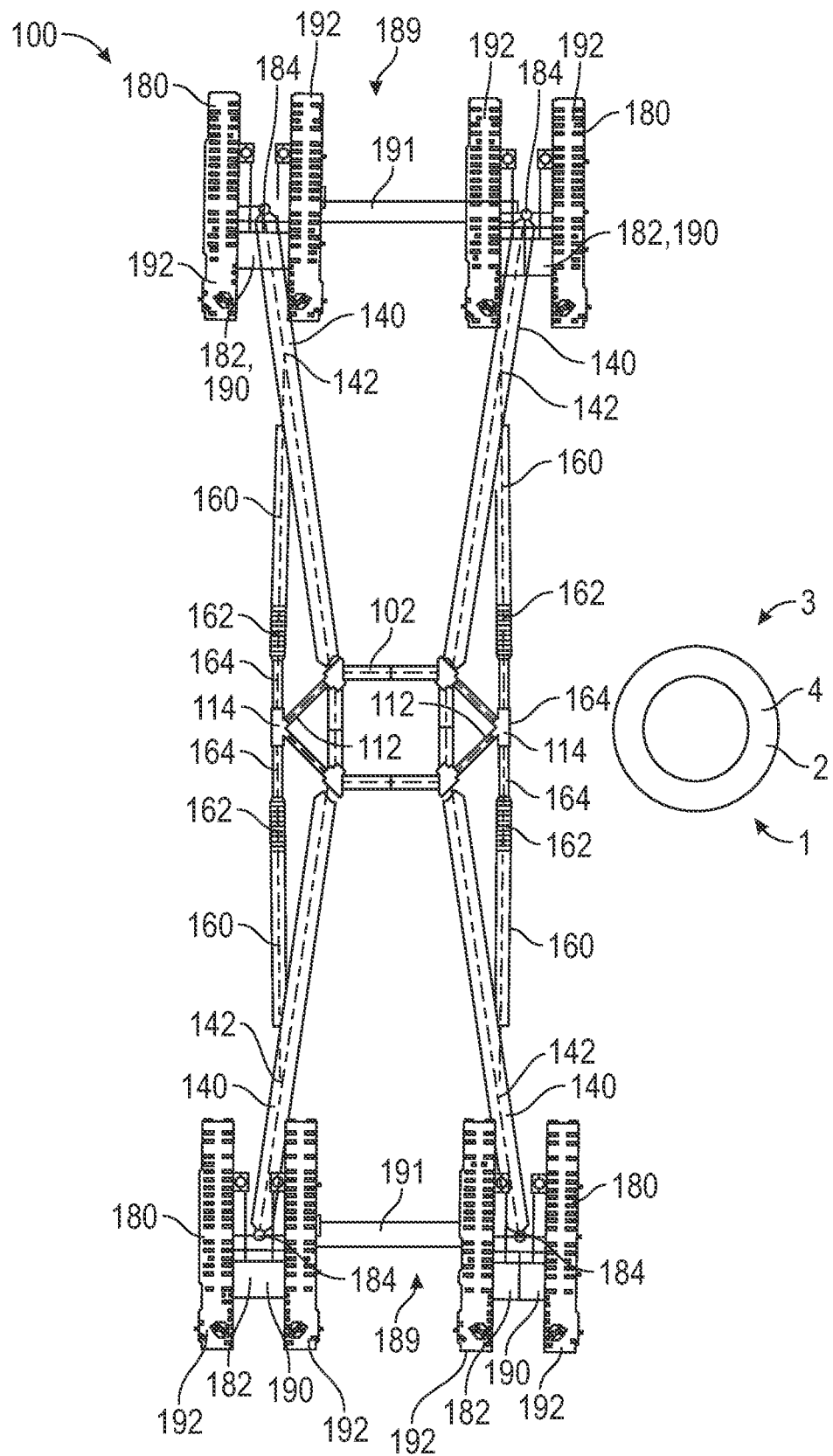
FIG. 8 is a cross-sectional view of the tower crane of FIG. 1 in a transport configuration.
Figure 9:
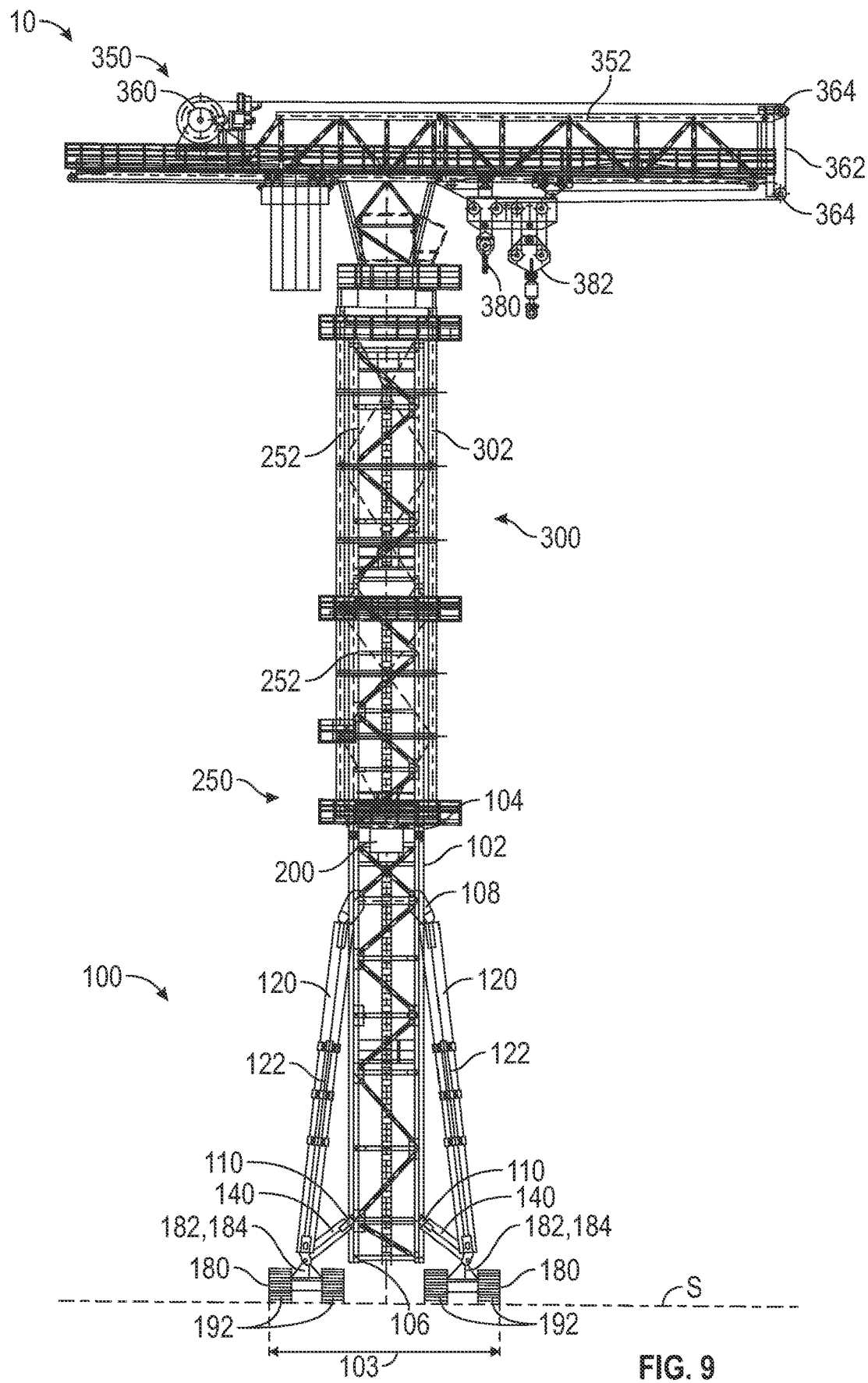
FIG. 9 is a front view of the tower crane of FIG. 1 in the transport configuration.

In this example and as shown particularly in FIGS. 8, 9, either before or following the actuation of the locks 164 of horizontal braces 160 into the locked position, the motor 190 of each transporter 180 may again be operated to rotate each transporter 180 approximately 45 degrees about a vertical axis such that each transporter 180 extends in a substantially parallel direction, the transporters 180 remaining arranged in circumferentially adjacent pairs 189. In this position, a locking bar 191 (shown in FIG. 8) may be coupled between the transporters 180 of each circumferentially adjacent pair 189 to thereby lock the transporters 180 of each pair 189 together and provide additional stability to transport assembly 180 as tower crane 10 travels between work sites 3.

With transporters 180 arranged as shown in FIGS. 8, 9 with locking bars 191 coupled therewith, transport assembly 100 is disposed in the transport configuration ready to transport the tower crane 10 between distal work sites 3. While in this exemplary embodiment locking bars 191 are used to lock transporters 180 together when transport assembly 100 is in the transport configuration, in other embodiments, transport assembly 100 may not include locking bars 191 when assembly 100 is in the transport configuration. Additionally, in some embodiments, to provide additional stability the boom 352 of boom assembly 350 may extend orthogonal a direction of travel of tower crane 10 as tower crane 10 travels between distal work sites 3. In some embodiments, transporters 180 are each rotated approximately 90 degrees in the transport configuration relative to the support configuration.

When transport assembly 100 is in the support configuration shown in FIG. 4, transport assembly 100 may have a first width 103 that is greater than a second or reduced width 105 of transport assembly 100 when assembly 100 is in the transport configuration as shown in FIG. 9. The reduced width 105 of transport assembly 100 may allow tower crane 10 to travel along relatively narrow roads or pathways extending between distal work sites 3.

As described above and still referring to FIGS. 8, 9, control system 200 may control some aspects of the operation of transport assembly 100 as well as other features of tower crane 10. In this embodiment, control system 200 is configured to automatically control the actuation of linear actuators 122 of diagonal braces 120 so as to stabilize tower crane 10 as tower crane 10 is transported between distal work sites 3 by transporters 180. Particularly, control system 200 is configured to maintain the central axis 15 of tower crane 10 in a substantially vertical orientation (relative to the direction of gravity) as tower crane 10 is transported between distal work sites 3.

For example, when tower crane 10 is travelling a sloped terrain the ground 5 may be disposed at an angle relative to the direction of gravity. As the tower crane 10 enters the sloped terrain, control system 200 may automatically retract the linear actuators 122 of a first pair of diagonal braces 120 positioned along a first side of the tower crane 10 while concurrently extending the linear actuators 122 of a second pair of the diagonal braces positioned along a second, opposing side of tower crane 10 to to maintain the vertical orientation of central axis 15 as tower crane 10 traverses the sloped terrain. In some embodiments, control system 200 includes one or more inclination sensors, such as accelerometers, mounted to tower crane 10 (e.g., to central support frame 102) and configured to detect an orientation of the one or more inclination sensors relative to the direction of gravity. Control system 200 may include a processor, such as a central processing unit (CPU), configured to determine an orientation of the central axis 15 of tower unit 10 relative to the direction of gravity based on signals provided by the one or more inclination sensors in signal communication with the processor. Additionally, the processor of control system 200 may be configured to automatically actuate the linear actuators 122 of diagonal braces 120 in response to the signals provided by the one or more inclination sensors. In this manner, control system 200 may automatically (e.g., without the assistance of an operator of tower crane 10) maintain the vertical orientation of central axis 15 of tower crane 10 as tower crane 10 travels along uneven or sloped terrain.

Figure 10:
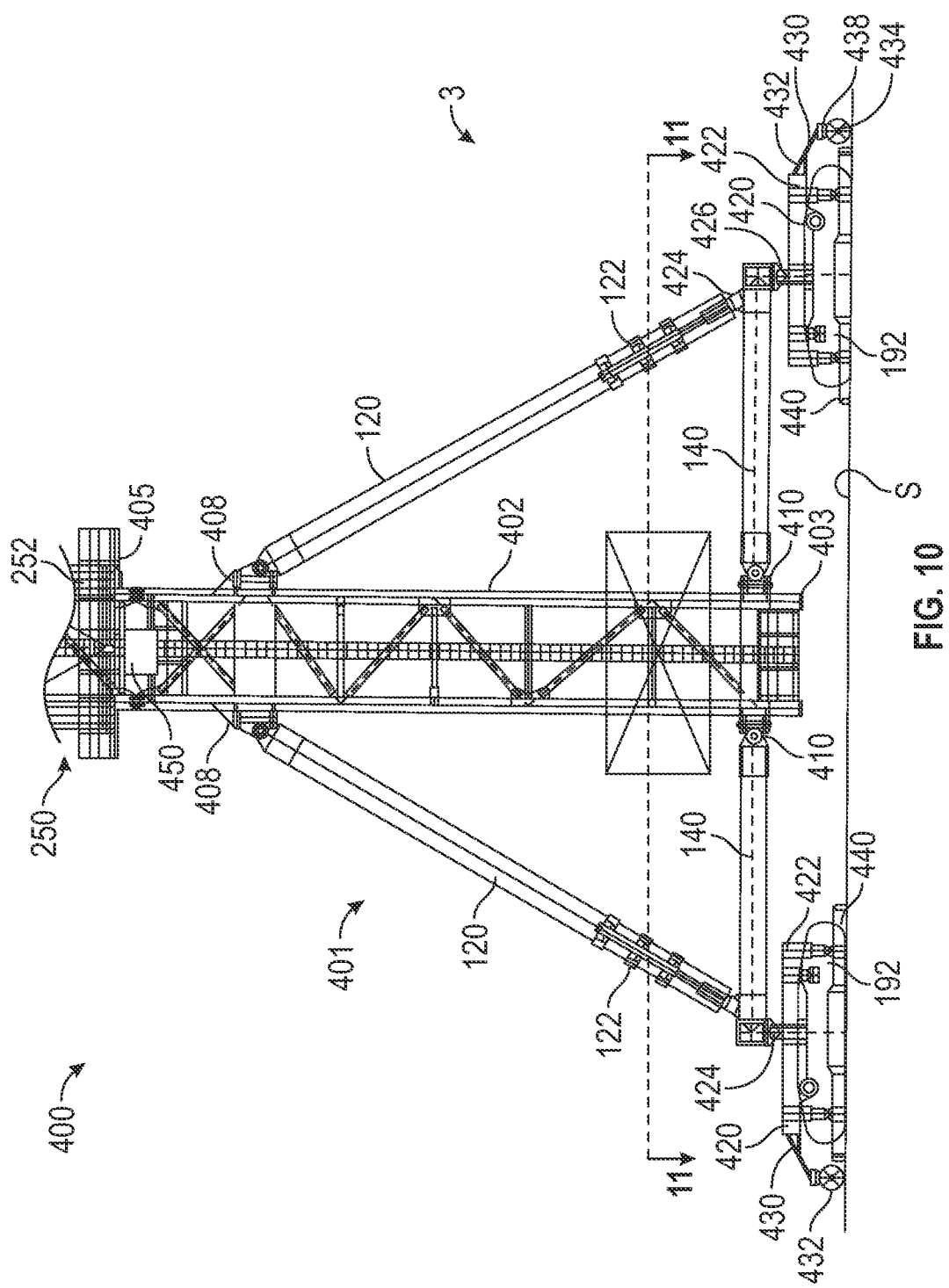
FIG. 10 is a front view of another embodiment of a tower crane.
Figure 11:
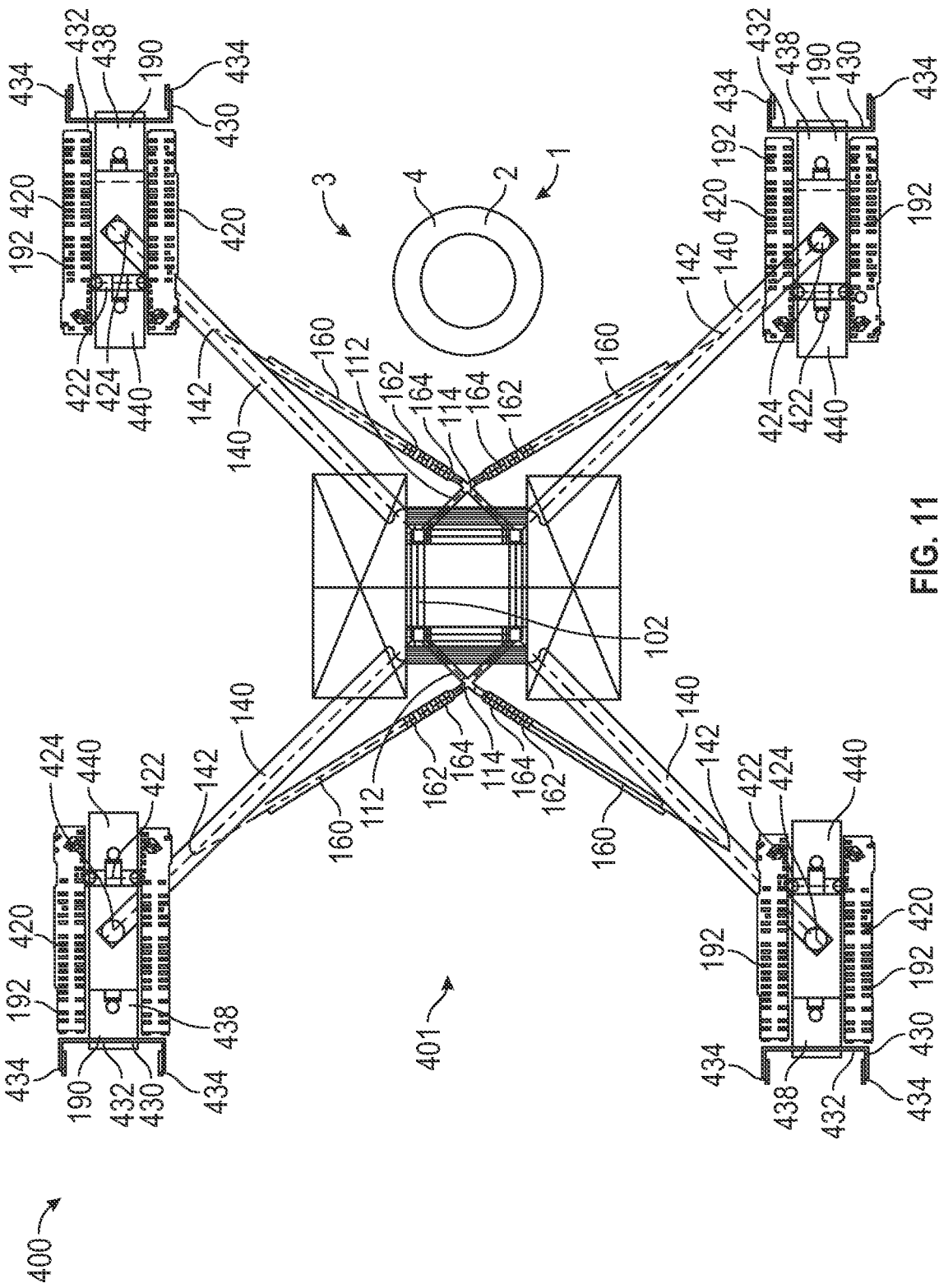
FIG. 11 is a cross-sectional view along lines 11-11 in FIG. 10 of the tower crane of FIG. 10.
Figure 12:
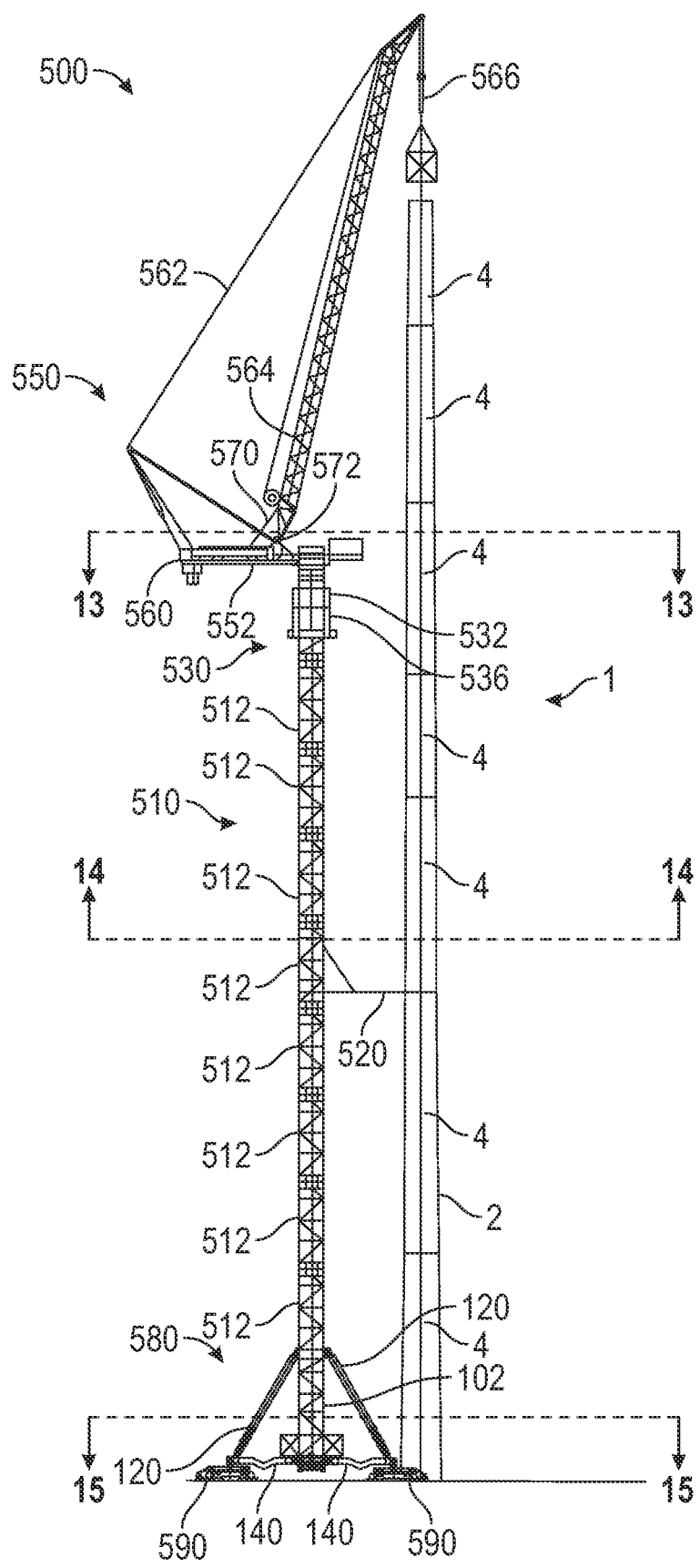
FIG. 12 is a front view of another embodiment of a tower crane.
Figure 13:
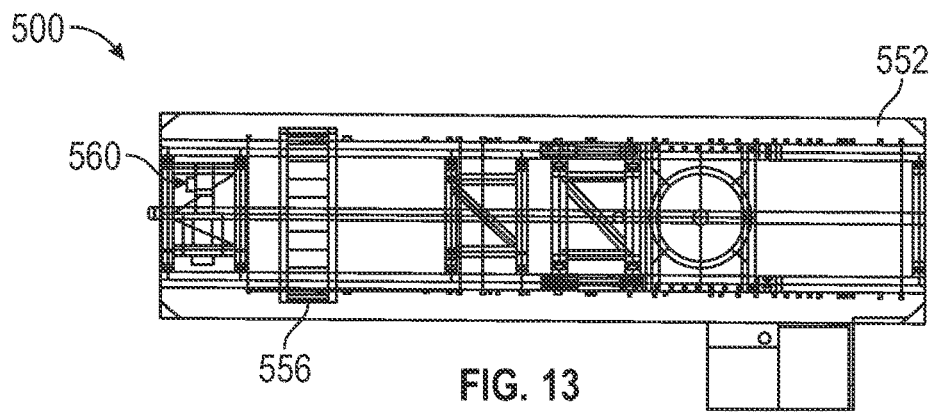
FIG. 13 is a cross-sectional view along lines 13-13 of FIG. 12 of the tower crane of FIG. 12.
Figure 14:
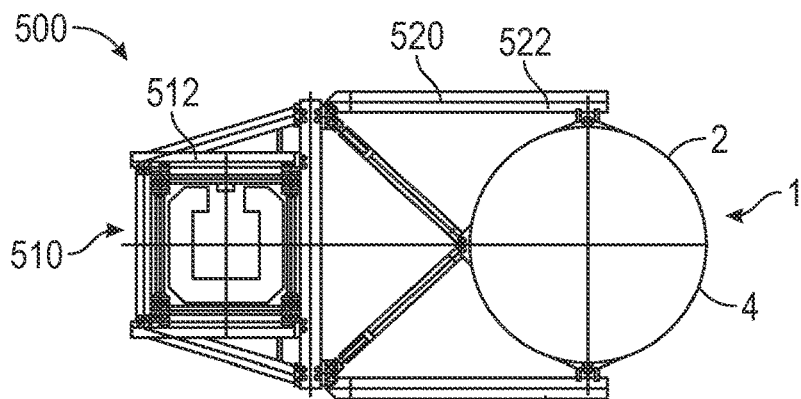
FIG. 14 is a cross-sectional view along lines 14-14 of FIG. 12 of the tower crane of FIG. 12.

Referring now to FIGS. 10, 11 another embodiment of a tower crane 400 is shown. Tower crane 400 may include features in common with the tower crane 10 shown in FIGS. 1-9, and shared features are labeled similarly. Particularly, in this embodiment, tower crane 400 generally includes a transport assembly 401, tower assembly 250, climbing assembly 300, and boom assembly 350.

The transport assembly 401 of tower crane 400 generally includes a central support structure or frame 401, diagonal braces 120, transporter arms 140, horizontal braces 160, a plurality of self-propelled transporters or crawlers 420, and a control system 450. Central support frame 402 may be comprised of a plurality of support beams or members coupled together such as steel I-beams or other types of structural support members. In this embodiment, central support frame 402 includes a first or lower end 403, a second or upper end 405, a plurality of first or upper pivot mounts 408, and a plurality of second or lower pivot mounts 410, and control arms 112. Similar to the upper pivot mounts 108 and lower pivot mounts 110 of the transport assembly 100, upper pivot mounts 408 of transport assembly 401 pivotably couple to diagonal braces 120 while lower pivot mounts 410 pivotably couple to horizontal braces 140. Additionally, in this embodiment, each upper pivot mount 408 and each lower pivot mount 410 includes a polytetrafluoroethylene (PTFE) pad 409, 411, respectively, to lubricate pivot mounts 408, 410.

Each transporter 420 of transport assembly 401 generally includes a body 182, motor 190, and crawler tracks 192 rotatably coupled to and driven by the motor 190. The body 422 of each transporter 420 may be similar to the body 182 of each transporter 180 described above except that a pivot mount 424 of body 422 includes a bushing 424 (e.g., a bronze bushing) to lubricate the connection between pivot mount 424 and a corresponding diagonal brace 120, and a PTFE pad 426 configured to lubricate the pivotal connection between the pivot mount 420 and a corresponding transporter arm 140. Additionally, each transporter 420 includes a guide assembly 430 including a guide body 432 and a pair of guide wheels 434 rotatably coupled to the guide body 432. In some embodiments, the guide body 432 of each guide assembly 430 is pivotably coupled to the body 422 of one of the transporters 422. In this embodiment, an inclination sensor 436 is coupled to the guide body 432 of each guide assembly 430. The inclination sensors 438 of guide assemblies 430 are each in signal communication with the control system 450 of transport assembly 301, which may separately include an inclination sensor positioned proximal a central axis of tower crane 400. Each transporter 420 further includes a pad 440 positioned along a bottom of the transporter 420 between the crawler tracks 192 and contacting or positioned directly adjacent the ground 5. The pad 440 of each transporter 420 may transmit operating loads (e.g., structural loads of tower crane 400, wind loads applied to crane 400, etc.) from the transporter 420 to the ground 5 where such loads may exceed the load capacity of crawler tracks 192.

In this embodiment, guide assemblies 430 may be positioned along a front and a rear of the tower crane 400 as tower crane 400 is transported between work sites 3 by transporters 420. Thus, as tower crane 10 encounters uneven terrain (e.g., sloped terrain, etc.), the pair of guide assemblies 430 positioned at the front of the tower crane 10 will encounter the uneven terrain before the crawler tracks 192 of the transporters 420 positioned at the front of the tower crane 400. The inclination sensor 438 of each guide assembly 430, being coupled to guide frame 432, may detect a change in inclination in response to the guide assembly 430 encountering the uneven terrain, and may communicate signals to the control system 450 corresponding to the detected inclination. In this manner, guide assemblies 430 may provide advance warning to control system 450 of upcoming uneven terrain which the tower crane 400 will soon encounter, providing time for control system 450 to adjust the inclination of tower crane 400 (e.g., via actuating the linear actuators 122 of diagonal braces 120) as or before the crawler tracks 192 of tower crane 400 encounter the uneven terrain. The advance warning provided by guide assemblies 430 may prevent the inclination of tower crane 400 from deviating substantially from vertical as tower crane 400 encounters uneven terrain.

Referring now to FIGS. 12-15, another embodiment of a tower crane 500 is shown. Tower crane 500 may include features in common with the tower crane 10 shown in FIGS. 1-9 and tower crane 400 shown in FIGS. 10, 11, and shared features are labeled similarly. Tower crane 500 may be utilized to assemble a wind turbine such as, for example, the wind turbine 1 shown in FIG. 12. In this exemplary embodiment, tower crane 500 generally includes a tower assembly 510, a climbing assembly 530, a boom assembly 550, and a transport assembly 580, and a control system 630.

The tower assembly 510 comprises a plurality of vertically stacked tower sections 512 which may be assembled end-to-end using climbing assembly 530 and boom assembly 550 as tower crane 500 assembles wind turbine 1. Tower assembly 510 is configured and functions similarly as the tower assembly 250 described above, and thus tower assembly 510 is not described in detail herein.

However, in this exemplary embodiment, it may be noted that tower assembly 510 includes a tie off strut 520 positioned along the vertical length of tower assembly 510 and which provides additional physical support to tower crane 500. Particularly, tie off strut 520 extends laterally from one of the tower crane sections 512 of tower assembly 510 and includes a pair of opposing arms 522 which grip the wind turbine tower 2 of wind turbine 1 and thereby transfer structural loads between the tower assembly 510 of tower crane 500 and the wind turbine tower 2 of wind turbine 1. The ability to transfer loads between tower assembly 510 and wind turbine tower 2 may assist in stabilizing tower crane 500 during operation. However, it may be understood that in some embodiments the tower assembly 510 of tower crane 500 may not include tie off strut 520.

The climbing assembly 530 of tower crane 500 assembles the tower assembly 510 of tower crane 500 during operation and generally includes a climbing frame 532 and a climbing actuator assembly 536. Climbing frame 532 provides structural support to climbing assembly 530 and is similar in configuration and function as the climbing frame 302 described above, and thus will not be described in detail herein. The climbing actuator assembly 536 of climbing assembly 530 transports climbing assembly 530 vertically along the tower crane sections 512 of tower assembly 510 and is similar in configuration and function as the climbing actuator assembly 310 described above, and thus will also not be described in detail herein In this exemplary embodiment, the boom assembly 550 of tower crane 500 generally comprises a "luffing" boom which is different in configuration from the "flat top" boom of the boom assembly 350 described above. Boom assembly 550 generally includes a crane floor 552, a counterweight 556, a luffing winch 560, a luffing boom 564 and one or more boom actuators 570. The crane floor 552 provides structural support to boom assembly 550 and connects boom assembly 550 with tower assembly 510 and climbing assembly 530 of tower crane 500. Additionally, crane floor 552 houses the counterweight 556 of boom assembly 550.

Luffing winch 560 of boom assembly 550 is supported on crane floor 552 and receives a lifting cable 562 of boom assembly 562 which may be extended from and retracted to the luffing winch 560. The luffing boom 564 of boom assembly 550 controls the position of a lifting member (e.g., a lifting hook, etc.) 566 of boom assembly 550 which is suspended from a distal end of luffing boom 564 and is connected to an end of the lifting cable 562. Luffing boom 564 is supported on the crane floor 552 and extends at an inclined angle from the crane floor 552 instead of laterally as with flat top booms. Additionally, an angle of inclination of the luffing boom 564 may be controlled by the one or more luffing actuators 570 of boom assembly 550.

Particularly, a proximal end of the luffing boom 560 is pivotably connected to the crane floor 552 at one or more pivotable joints 572. Luffing boom 560 may be pivoted about a horizontally extending pivot axis (extending through the one or more pivotable joints 572) by the one or more actuators 570 to control a vertical position of the lifting member 566. In this manner, the lifting member 566 may be vertically raised and lowered without needing to vertically raise and lower the crane floor 552 of boom assembly 550. However, it may be understood that in some embodiments, boom assembly 550 may comprise a flat top boom similar in configuration as boom assembly 350 described above.

Figure 15:
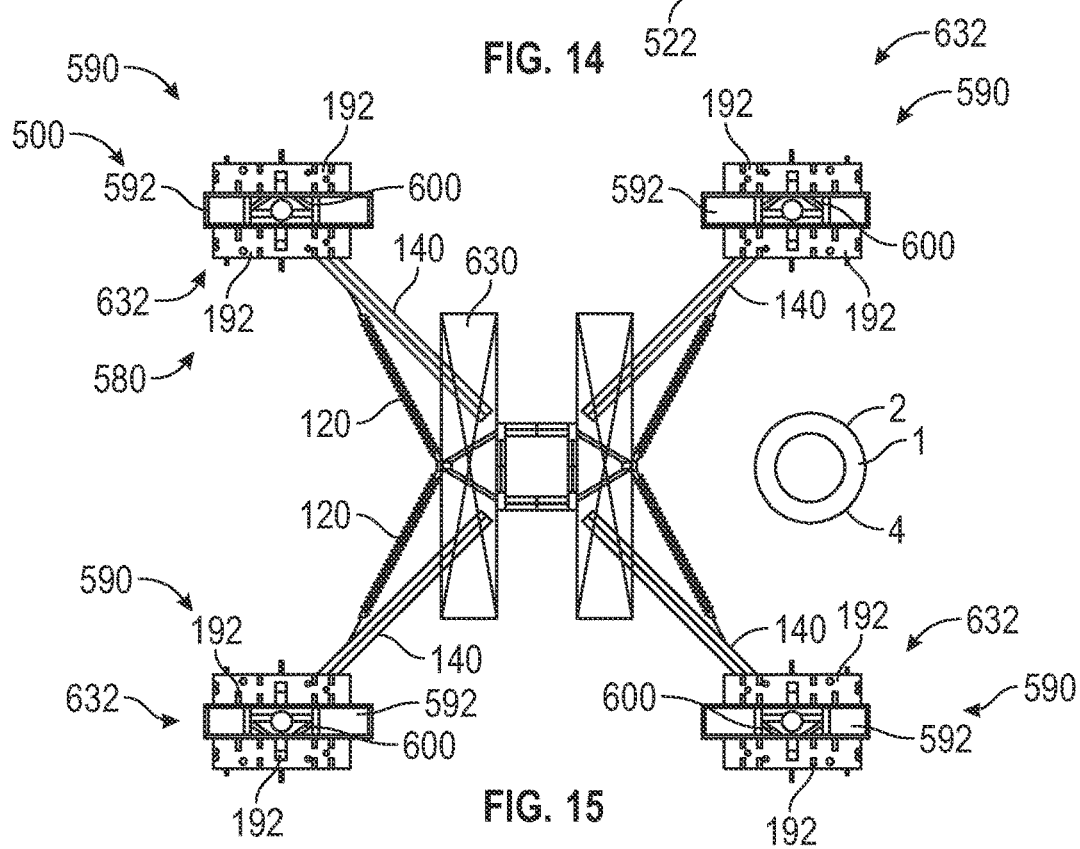
FIG. 15 is a cross-sectional view along lines 15-15 of FIG. 12 of the tower crane of FIG. 12.
Figure 16:
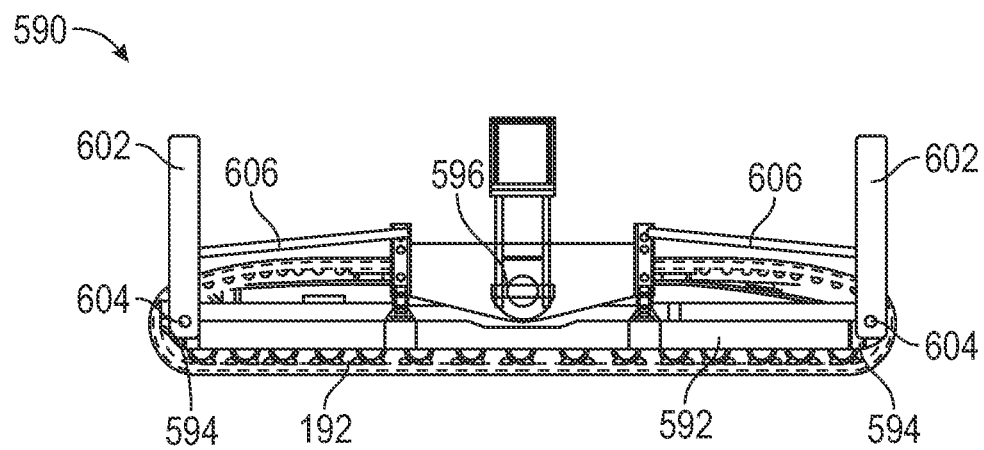
FIGS. 16, 17 are front views of an embodiment of a transporter of the tower crane of FIG. 12.
Figure 17:
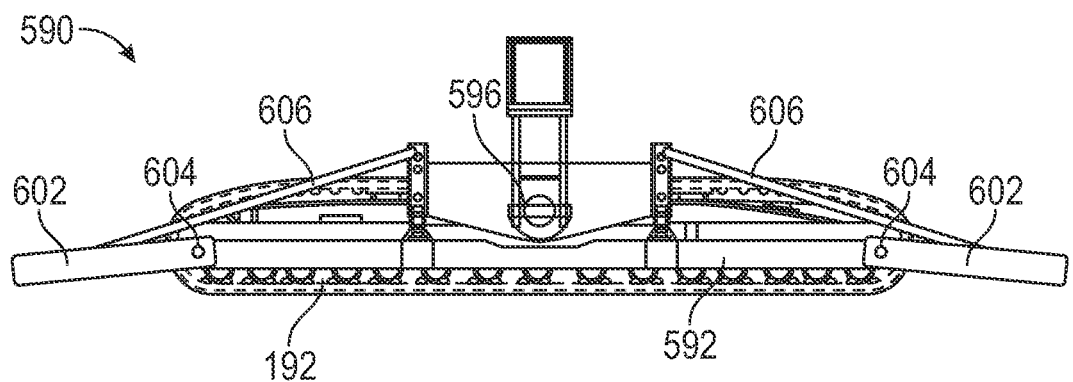

Referring to FIGS. 12, 15-17, additional views of the transport assembly 580 are shown particularly in FIGS. 15-17. Similar to transport assembly 100 described above, transport assembly 580 of tower crane 500 transports the tower crane 500 between one or more work sites 3 along uneven terrain. Transport assembly 580 also includes many features in common with transport assembly 100 including, for example, central support frame 102, diagonal braces 120, and transporter arms 140. However, transport assembly 580 also includes a plurality (four in this exemplary embodiment) transporters 590 which differ in configuration from the transporters 180 of the transport assembly 100.

Particularly, each transporter 590 generally includes an elongate body 592, a motor 600 (hidden from view in FIGS. 16, 17 but supported on body 592), continuous crawler tracks 192, and a pair of ground support pads 602. As shown particularly in FIGS. 16, 17, the body 592 of each transporter 590 is positioned between the pair of crawler tracks 192 and extends between opposed longitudinal ends 594, and includes a pivot joint or mount 596 for connecting with one of the diagonal braces 120 of the transport assembly 180.

Ground support pads 602 are positioned at the longitudinal ends 594 of body 592. A proximal end of each ground support pad 602 is pivotably couple to body 592 at one of the longitudinal ends 594 thereof via a pivotable joint 604. Additionally, each transporter 590 comprises a pair of pad actuators 606 (e.g., linear hydraulic actuators, etc.) connected between the body 592 and the pivotable ground support pads 602. Pad actuators 606 are configured to pivot the ground support pads 602 about a pair of corresponding horizontally extending pivot axes (extending through the pivotable joints 604) relative to the body 592.

Particularly, pad actuators 606 may pivot ground support pads 602 between a first or retracted position shown in FIG. 16, and a second or deployed position shown in FIG. 17 that is at a non-zero angle relative to the retracted position. In this exemplary embodiment, ground support pads 602 are disposed in a substantially vertical orientation when in the retracted position, and in a substantially horizontal orientation when disposed in the deployed position. Additionally, ground support pads 602 are pivoted away from the terrain upon which the transporter 590 is positioned when in the retracted position such that ground support pads 602 do not contact the terrain. Conversely, at least a portion of each ground support pad 602 contacts the terrain when in the deployed position. In this manner, ground support pads 602 increase the surface area of the transporter 590 in contact with the terrain at a given point in time when ground support pads 602 are actuated into the extend position by pad actuators 606.

Referring now to FIGS. 12-17, the control system 630 (shown in FIG. 15) of tower crane 500 may control the operation of various actuators of tower crane 500 in response to sensor data and other information provided to control system 630. For example, control system 630 may have similar functionality as control systems 200, 450 described above. Additionally, in this exemplary embodiment, control system 630 may control the operation of the pad actuators 606 of transporters 590 to selectably actuate the ground pads 602 of one or more transporters 590 between their respective retracted and deployed positions.

For example, in this exemplary embodiment, tower crane 500 includes a plurality of ground pressure sensors 632 (indicated generally by arrows 632 in FIG. 15) connected to the control system 630. Ground pressure sensors 632 continuously determine a ground pressure applied by each transporter 590 against the terrain on which tower crane 500 is positioned. In this manner, control system 630 may continuously monitor the ground pressure applied against the terrain by each of the transporters 590.

Additionally, control system 630 may include a ground pressure limit or threshold (e.g., stored in a memory of the control system 630) which, if exceeded by one of the transporters 590, may result in the transporter 590 sinking into and becoming stuck in the terrain. Control system 630 may act automatically to ensure that none of the transporters 590 exceed the ground pressure limit as the tower crane 500 travels along the terrain. Particularly, in response to the ground pressure applied by one of the transporters 590 reaching the ground pressure limit, the control system 630 may force tower crane 500 to come to a stop and automatically deploy the ground support pads 602 of the given transporter 590 into the deployed position to thereby reduce the ground pressure applied by the transporter 590 to a level that is less than the ground pressure limit.

Additionally, control system 630 may redistribute the weight applied between the transporters 590 to further reduce the ground pressure applied by the given transporter 590 from which the ground support pads 602 have been deployed. For example, control system 630 may automatically operate actuators 122 of diagonal braces 120 to shift weight from the transporter 590 having the deployed ground support pads 602 to the other three transporters 590 of the tower crane 500. In some embodiments, control system 630 may lift and reposition one of the transporters 590 (shifting the weight of tower crane 500 to the other three transporters 590) should the particular transporter 590 become stuck in the terrain. It may be understood that in some embodiments the actions of deploying ground support pads 602 of a given transporter 590, transferring weight from a given transporter 590, and/or lifting a given transporter 590 may be done manually by an operator of tower crane 500 through the control system 630.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the invention. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A tower crane for assembling a wind turbine, comprising:
   a boom assembly comprising a boom and a hoisting block coupled to the boom;
   an extendable tower assembly comprising a plurality of tower sections; and
   a transport assembly comprising a central support frame coupled to the tower assembly, a plurality of independently self-propelled transporters configured to transport the tower crane, and a plurality of diagonal braces extending between the central support frame and the plurality of transporters, wherein each of the plurality of diagonal braces comprises a linear actuator positioned along the diagonal brace and configured to selectably extend and retract the diagonal brace.

2. The tower crane of claim 1, wherein the transport assembly further comprises a plurality of transporter arms extending between the central support frame and the plurality of transporters and a plurality of horizontal braces extending between the central support frame and the plurality of transporter arms, and wherein each of the plurality of horizontal braces comprises a passive linear damper.

3. The tower crane of claim 2, wherein each of the plurality of the horizontal braces comprises a lock configured to selectably lock the linear damper.

4. The tower crane of claim 1, wherein each of the plurality of transporters of the transport assembly comprises a guide assembly that is pivotably coupled to a body of the transporter, and wherein the guide assembly comprises an inclination sensor in signal communication with a control system of the transport assembly.

5. The tower crane of claim 1, wherein the transport assembly further comprises a control system comprising a processor and a memory containing instructions executable by the processor to maintain a predetermined inclination of a central axis of the tower crane as the tower crane is transported by the plurality of transporters.

6. The tower crane of claim 5, wherein the control system comprises an inclination sensor.

7. The tower crane of claim 1, further comprising a climbing assembly coupled between the tower assembly and the boom assembly and configured to extend a height of the tower assembly.

8. The tower crane of claim 1, wherein each of the plurality transporters comprises a ground support pad actuatable between a retracted position spaced from a terrain on which the tower crane is positioned and a deployed position in contact with the terrain.

9. The tower crane of claim 8, further comprising a control system comprising a processor and a memory containing instructions executable by the processor to automatically deploy the ground pad of each of the plurality of transporters from the retracted position to the deployed position in response to a ground pressure applied by the transporter against the terrain, as determined by a ground pressure sensor of the lower crane, reaching a predefined ground pressure limit.

10. A tower crane for assembling a wind turbine, comprising:
   a boom assembly comprising a boom and a hoisting block coupled to the boom;
   an extendable tower assembly comprising a plurality of tower sections; and a transport assembly comprising a central support frame coupled to the tower assembly, a plurality of independently self-propelled transporters coupled to the central support frame and configured to transport the tower crane, a plurality of diagonal braces extending diagonally between the central support frame and the plurality of transporters, and a control system comprising a processor and a memory containing instructions executable by the processor to selectably extend and retract the plurality of diagonal braces to maintain a predetermined inclination of a central axis of the tower crane as the tower crane is transported by the plurality of transporters.

11. The tower crane of claim 10, wherein each of the plurality of diagonal braces comprises a linear actuator positioned along the diagonal brace and configured to selectably extend and retract the diagonal brace.

12. The tower crane of claim 11, wherein the linear actuator of each of the plurality of diagonal braces is controlled by the control system to maintain the predetermined inclination of a central axis of the tower crane.

13. The tower crane of claim 10, wherein the transport assembly comprises a support configuration having a first width and a transport configuration having a second width that is less than the first width.

14. The tower crane of claim 10, wherein each of the plurality of transporters is displaceable along a circumference to actuate the transport assembly from the support configuration to the transport configuration.

15. The tower crane of claim 10, wherein each of the plurality of transporters of the transport assembly comprises a guide assembly that is pivotably coupled to a body of the transporter, and wherein the guide assembly comprises an inclination sensor in signal communication with a control system of the transport assembly.

16. The tower crane of claim 15, wherein each of the plurality of transporters comprises a ground support pad actuatable between a retracted position spaced from a terrain on which the tower crane is positioned and a deployed position in contact with the terrain.

17. The tower crane of claim 16, further comprising a control system comprising a processor and a memory containing instructions executable by the processor to automatically deploy the ground pad of each of the plurality of transporters from the retracted position to the deployed position in response to a ground pressure applied by the transporter against the terrain, as determined by a ground pressure sensor of the lower crane, reaching a predefined ground pressure limit.

18. The tower crane of claim 10, further comprising a climbing assembly coupled between the tower assembly and the boom assembly and configured to extend a height of the tower assembly.

19. The tower crane of claim 10, wherein each of the plurality of transporters comprises a ground support pad actuatable between a retracted position spaced from a terrain on which the tower crane is positioned and a deployed position in contact with the terrain.

20. The tower crane of claim 19, further comprising a control system comprising a processor and a memory containing instructions executable by the processor to automatically deploy the ground pad of the transporter from the retracted position to the deployed position in response to a ground pressure applied by the transporter against the terrain, as determined by a ground pressure senor of the tower crane, reaching a predefined ground pressure limit.

21. A tower crane for assembling a wind turbine, comprising:
a boom assembly comprising a boom and a hoisting block coupled to the boom;
an extendable tower assembly comprising a plurality of tower sections; and
a transport assembly comprising a central support frame coupled to the tower assembly, a plurality of independently self-propelled transporters coupled to the central support frame and configured to transport the tower crane, wherein each of the plurality of transporters comprises a guide assembly that is pivotably coupled to and positioned at a front of a body of the transporter, and wherein the guide assembly rides on the terrain ahead of the body of the transporter and comprises an inclination sensor in signal communication with a control system of the transport assembly.

22. The tower crane of claim 21, wherein the transport assembly further comprises a plurality of diagonal braces each extending between the central support frame and the plurality of transporters, wherein each of the plurality of diagonal braces comprises a linear actuator positioned along the diagonal brace and configured to selectably extend and retract the diagonal brace.

23. The tower crane of claim 21, wherein each of the plurality of transporters comprises motor coupled to the body and a pair of continuous crawler tracks rotatable about the body.

24. The tower crane of claim 21, wherein the control system comprises a processor and a memory containing instructions executable by the processor to maintain a predetermined inclination of a central axis of the tower crane as the tower crane is transported by the plurality of transporters.

25. The tower crane of claim 21, wherein the transport assembly further comprises a plurality of transporter arms extending between the central support frame and the plurality of transporters and a plurality of horizontal braces extending between the central support frame and the plurality of transporter arms, and wherein each of the plurality of horizontal braces comprises a passive linear damper.

26. The tower crane of claim 21, further comprising a climbing assembly coupled between the tower assembly and the boom assembly and configured to extend a height of the tower assembly.

* * * * *